United States Patent
Bush et al.

[11] 3,791,141
[45] Feb. 12, 1974

[54] RAMJET ENGINE FUEL CONTROLLER

[75] Inventors: John E. Bush; Leland M. Horgan, both of China Lake, Calif.

[73] Assignee: The United States of America as represented by the Secretary of the Navy, Washington, D.C.

[22] Filed: Oct. 2, 1972

[21] Appl. No.: 294,049

[52] U.S. Cl. .............................................. 60/243
[51] Int. Cl. ............................................ F02k 7/10
[58] Field of Search ...... 60/243, 233, 238, 234, 240

[56] References Cited
UNITED STATES PATENTS

| | | | |
|---|---|---|---|
| 3,218,801 | 1/1965 | Vasu | 60/243 |
| 3,067,577 | 12/1962 | Dew | 60/243 |
| 2,974,479 | 3/1961 | Hoffman | 60/243 |
| 2,948,114 | 8/1960 | Beslier | 60/243 |
| 2,954,667 | 10/1960 | Laurent | 60/243 |

*Primary Examiner*—Clarence R. Gordon
*Attorney, Agent, or Firm*—R. S. Sciascia; Roy Miller; R. F. Beers

[57] ABSTRACT

A ramjet engine fuel controller for automatically giving the desired fuel/air ratio for all engines operating conditions. The controller consists of a scheduler and a limiter. The entire system is electronic or fluidic.

3 Claims, 1 Drawing Figure

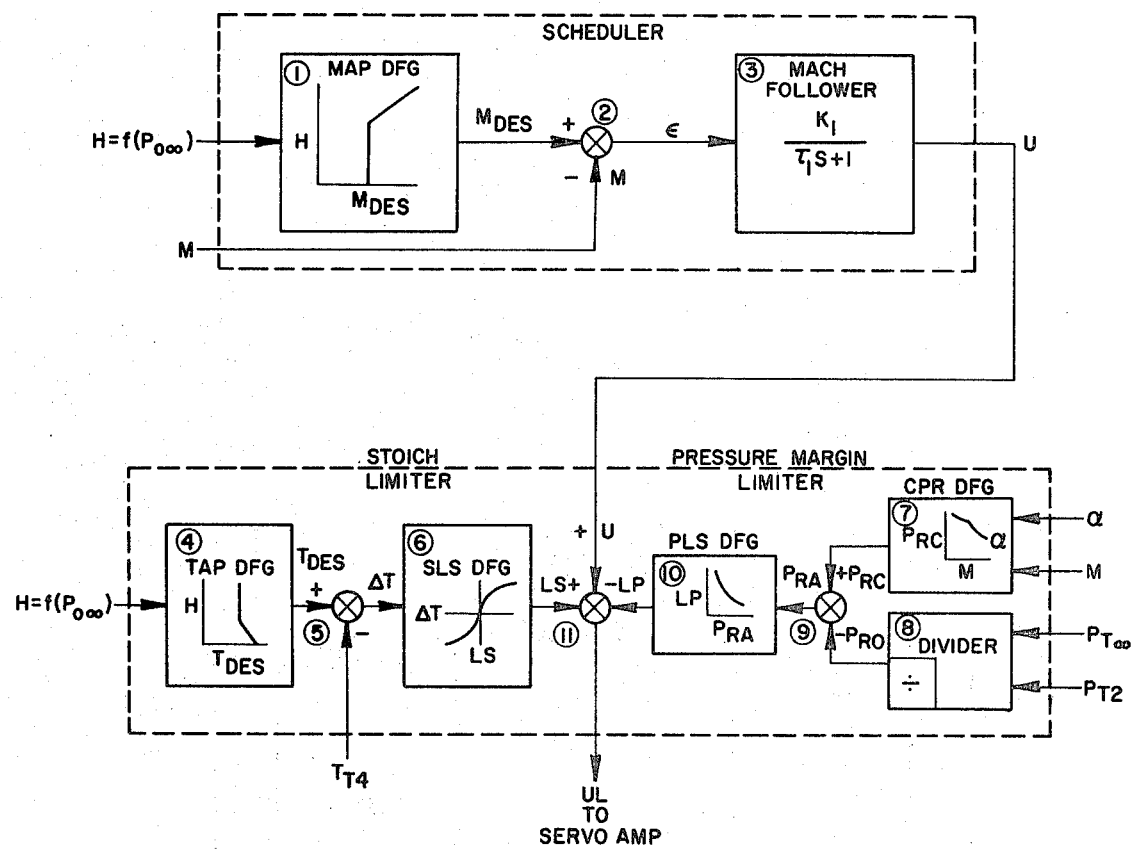

RAMJET ENGINE FUEL CONTROLLER

BACKGROUND OF THE INVENTION

1. Field of the Invention

This invention pertains to airbreathing engine fuel controllers.

2. Description of the Prior Art

It is predicted that hypersonic speed propulsion systems will be required for air launched missiles in the late 1970 to early 1980 era so that they can survive sophisticated target defense networks. Anti-surface-to-air missiles (SAM) will also need high speed capabilities. It is therefore desirable to develop the technology base for designing ramjet engines which can operate in the Mach 3 to 6 speed regime at sea level and Mach 4.5 to 7 at 50,000 feet.

A major problem in past ramjet engine development has been an automatic fuel-control system that is sensitive enough to give the desired fuel/air ratio for all operating conditions. Also the use of ramjet engines as versatile missile propulsion systems is limited by the allowable complexity of the engine controls. Reliability and cost are, of course, dependent on complexity. Previous fuel control systems which provide engine flexibility have been costly due to the sensory and mechanistic aspects of those systems which operate on pneumatic principles. In order to insure that the vehicle will operate efficiently within the inlet design limitations, the fuel control system must utilize closed loop feedback elements which either furnish information on the position of the shock in the inlet, or sufficient vehicle dynamics so that the fuel control command can be adjusted to maintain inlet operation within the allowable pressure ratio Mach number envelope.

The present invention employs a pressure margin limiter for providing information on the position of the shock in the inlet. Since this limiter uses measured vehicle flight parameters, an inlet shock position sensor is not required. This is advantageous in that shock position sensors are inherently noisy. There are also no probes to degrade the performance of the inlet. The limiter is based on four measured feedback parameters namely:

1. Diffuser total pressure.
2. Free stream total pressure.
3. Mach number.
4. Angle of attack.

Only one parameter, diffuser total pressure, is taken from the engine.

SUMMARY OF THE INVENTION

A ramjet engine fuel controller including a scheduler, stoichiometric limiter and pressure margin limiter. A Mach-altitude profile diode function generator receives information as to the altitude and produces a desired Mach number which is compared to the negative of the actual Mach number with a summing amplifier. The difference between the two is an error signal which is fed into a Mach follower. The Mach follower produces a fuel command signal equal to the error in Mach number times the constant minus a time constant times the differential of the command signal.

In the stoichiometric limiter a temperature-altitude profile diode function generator produces a desired temperature upon receiving altitude information. This desired temperature is compared to the negative of the combustor temperature with a summing amplifier producing a temperature differential. This temperature differential is fed into a stoichiometric limit signal diode function generator which produces as an output a limiting signal.

The pressure margin limiter includes a critical pressure ratio diode function generator which receives information on angle of attack and actual Mach number and produces a critical pressure recovery ratio. Also, in the pressure margin limiter, the free stream total pressure is divided by the diffuser total pressure giving the operating pressure recovery ratio. The critical pressure recovery ratio is compared to the negative of the operating pressure recovery ratio with a summing amplifier producing the available pressure recovery ratio. The available pressure recovery ratio is fed into a pressure margin limit signal diode function generator which gives as an output the negative of the pressure margin limit signal.

Both the stoichiometric limit signal and the pressure margin limit signal are subtracted or added to the fuel command signal with a summing amplifier. The summing amplifier produces the limited fuel command signal which is the input to a fuel control valve servo amplifier.

BRIEF DESCRIPTION OF THE DRAWING

The drawing is a schematic of the invention.

DESCRIPTION OF THE PREFERRED EMBODIMENT

The invention of a ramjet engine fuel controller as shown in the FIGURE in block diagram form may be an electronic or a fluidic processing unit. The functions of the fuel controller have been separated into that of scheduler and limiter. The scheduler can have a relatively low frequency response and has the task of controlling the fuel to keep the velocity of the ramjet vehicle at a value for high acceleration capability or high cruise perforance.

In the scheduler the Mach follower 3 is so named because it attempts to maintain a given Mach number altitude profile. In a flight weight scheduler the desired Mach-altitude-profile (MAP) would be preset for a particular mission in the MAP diode function generator (DFG)1. As the desired Mach number ($M_{des}$) changes as a function of altitude (H) or ambient static pressure ($P_{o\ oo}$) an electrical output signal from the MAP DFG proportional to the desired Mach number would be compared to an electrical feedback signal proportional to the flight Mach number (M) at a summing amplifier 2. The summing amplifier 2 produces a signal proportional to the error in Mach number ($\epsilon$). The Mach Follower 3 is represented by a LaPlace transfer function.

$$U(s)/\epsilon(s) = K/\tau s + 1$$

or $U = K\epsilon - \tau dU$

The fuel command signal ($U$) is equal to the error in Mach number ($\epsilon$) times a constant ($K$) minus a time constant ($\tau$) times the differential of the command signal.

The function of the limiter is to limit or augment the signal coming from the scheduler, controlling the fuel to keep the ramjet engine lit and operating in a desirable range of pressure margin and limiting equivalence ratio to less than one but not below the lean blowout limit. In order to tailor the equivalence ratio, which is the operating fuel to air ratio divided by the stoichiometric fuel to air ratio, a corresponding temperature-altitude profile (TAP) is set into the TAP diode function generator (DFG) 4. As the desired temperature ($T_{des}$) changes as a function of altitude ($P_{o\ oo}$) an electrical output signal from the TAP DFG proportional to the desired temperature would be compared to an electrical feedback signal proportional to the combustor temperature ($T_{t4}$) at a summing amplifier 5. The summing amplifier 5 produces a signal proportional to the error in temperature ($\Delta T$). The stoichiometric limit signal (SLS) 6 is then generated as a function of the error in temperature by the stoichiometric limit signal (SLS) diode function generator (DFG). If the combustion temperature ($T_{t4}$) is greater than the desired temperature the limit signal is negative, if the opposite is true the limit signal is positive. The exact function should be based on engine sensitivity.

The pressure margin limiter determines the condition of the shock wave in the engine inlet and accordingly limits fuel flow within the critical pressure ratio (Prc) of the engine inlet. It is based on four feedback parameters:

(a) diffuser total pressure ($P_{t2}$), (b) ambient total pressure ($P_{too}$), (c) Mach number ($M$), and (d) angle of attack ($a$). A critical pressure ratio (CPR) diode function generator (DFG) 7, set for any given inlet data, will compute the inlet critical pressure ratio (Prc) at the operating Mach number and angle of attack. The diffuser total pressure ($P_{t2}$) will be divided by the free stream total pressure ($P_{too}$) giving the operating pressure recovery ratio ($P_{ro}$). The operating pressure recovery ratio ($P_{ro}$) will be compared to the critical pressure recovery ratio (Prc) ) at a summing amplifier 9. The summing amplifier 9 produces a signal proportional to the available pressure recovery ratio ($P_{ra}$). The pressure margin limit signal (LP) is then generated as a function of the available pressure recovery ratio by the pressure margin limit signal (PLS) diode function generator (DFG) 10. The exact function should be based on inlet sensitivity to fuel flow accelerations. Both the stoichiometric limit signal (SLS) and the pressure margin limit signal (LP) are subtracted or added to the fuel command signal (U) at a summing amplifier 11. The summing amplifier produces the limited fuel command signal (UL) which is the input to a fuel control valve servo amplifier. Since pressure margin and equivalence ratio are functions of angle of attack and thus can change as rapidly as the vehicle airframe response, it is necessary for the limiter to have a relatively fast response compared to the scheduler.

What is claimed is:

1. An automatic fuel control system for a ramjet engine comprising:

a fuel scheduler for producing an electrical fuel command signal;

a stoichiometric limiter producing an electrical signal for limiting the equivalence ratio to less than one but not below the lean blow out limit;

a pressure margin limiter having a critical pressure ratio diode function generator for computing the inlet critical pressure ratio at the operating Mach number and angle of attack;

means feeding electrical signals proportional to Mach number and angle of attack into said critical pressure ratio generator;

said critical pressure ratio generator producing an electrical signal proportional to the critical pressure recovering ratio;

electrical signals proportional to diffuser total pressure and free stream total pressure being fed into a divider;

said divider dividing said diffuser total pressure signal by said free stream total pressure signal producing an electrical signal proportional to the negative of operating pressure recovery ratio;

said signal proportional to said operating pressure recovering ratio being compared to said electrical signal proportional to said critical pressure recovery ratio by summing said signals with a summing amplifier which in turn produces an electrical signal proportional to available pressure recovery ratio;

a pressure margin limit signal diode function generator for producing the negative of said pressure margin limit signal as a function of said available pressure recovery ratio; and summing means receiving said stoichiometric limiter signal to combine with said fuel scheduler signal for producing a limited fuel command signal as an input to a fuel control valve servo amplifier.

2. The system of claim 1 wherein said stoichiometric limiter comprises:

a TAP diode function generator with a temperature-altitude profile set into it;

means feeding an electrical input signal proportional to altitude into said TAP generator;

said TAP generator producing an electrical output signal proportional to the desired combustor temperature;

said TAP generator output signal being compared to an electrical signal proportional to the combustor temperature by a summing amplifier; producing an electrical signal proportional to the error in temperature;

a stoichiometric limit signal diode function generator for producing an electrical signal proportional to the error in temperature;

said electrical signal proportional to the error in temperature being fed into said stoichiometric limit signal generator;

said stoichiometric limit signal generator producing said stoichiometric limiter signal.

3. The system of claim 1 wherein said scheduler comprises:

a Mach-altitude-profile diode function generator in which a desired Mach altitude profile is preset;

means feeding an electrical input signal proportional to altitude into said Mach altitude profile generator;

said Mach altitude profile generator producing an electrical signal proportional to the desired Mach number;

said electrical signal proportional to said desired Mach number being compared to an electrical signal proportional to the negative of the actual flight Mach number by a summing amplifier which produces an electrical signal proportional to the error in Mach number;

said electrical signal proportional to said error in Mach number being fed into a Mach follower which in turn produces said electrical fuel command signal equal to said error in Mach number times a constant minus a time constant times the differential of said command signal.

* * * * *